United States Patent
Rust

(10) Patent No.: US 10,112,336 B2
(45) Date of Patent: Oct. 30, 2018

(54) PLANETARY ROLLER EXTRUDER WITH PLANET SPINDLES AND CONTACT RING

(71) Applicant: Harald Rust, Bochum (DE)

(72) Inventor: Harald Rust, Bochum (DE)

(73) Assignee: Entex Rust & Mitschke GmbH, Bochum (DE)

(*) Notice: Subject to any disclaimer, the term of this patent is extended or adjusted under 35 U.S.C. 154(b) by 786 days.

(21) Appl. No.: 14/523,239

(22) Filed: Oct. 24, 2014

(65) Prior Publication Data

US 2015/0043300 A1  Feb. 12, 2015

Related U.S. Application Data

(63) Continuation-in-part of application No. PCT/EP2012/005318, filed on Dec. 21, 2012.

(30) Foreign Application Priority Data

Apr. 26, 2012 (DE) .................. 10 2012 008 170

(51) Int. Cl.
*B29C 47/52* (2006.01)
*B29C 47/08* (2006.01)
(Continued)

(52) U.S. Cl.
CPC ............ *B29C 47/522* (2013.01); *A23P 30/20* (2016.08); *B01F 7/00525* (2013.01);
(Continued)

(58) Field of Classification Search
CPC .... A23P 30/20; B01F 15/00538; B01F 15/06; B01F 2015/061; B01F 2215/0014;
(Continued)

(56) References Cited

U.S. PATENT DOCUMENTS

| 3,728,056 A * | 4/1973 | Theysohn ........... B29C 47/1054 |
| | | 425/135 |
| 4,162,854 A * | 7/1979 | Ullrich ................ B29C 47/0861 |
| | | 366/83 |

(Continued)

FOREIGN PATENT DOCUMENTS

| CN | 202 162 989 | 3/2012 |
| DE | 197 21 808 | 11/1998 |

(Continued)

OTHER PUBLICATIONS

"High-quality extrusion with planetary rollers", Plastics Engineering, vol. 44, Nr:1, Jan. 1, 1988, pp. 30-32.

(Continued)

*Primary Examiner* — Tony G Soohoo
(74) *Attorney, Agent, or Firm* — Smartpat PLC

(57) ABSTRACT

A planetary roller extruder with planetary spindles and stop ring. The abstract of the disclosure is submitted herewith as required by 37 C.F.R. § 1.72(b). As stated in 37 C.F.R. § 1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

20 Claims, 3 Drawing Sheets

(51) Int. Cl.
*B29C 47/42* (2006.01)
*B29C 47/76* (2006.01)
*B29C 47/92* (2006.01)
*B29C 47/82* (2006.01)
*B01F 15/06* (2006.01)
*B01F 15/00* (2006.01)
*B01F 7/00* (2006.01)
*B29B 7/52* (2006.01)
*B29B 7/48* (2006.01)
*A23P 30/20* (2016.01)
*B29K 105/00* (2006.01)

(52) U.S. Cl.
CPC ........ *B01F 15/00538* (2013.01); *B01F 15/06* (2013.01); *B29B 7/485* (2013.01); *B29C 47/0803* (2013.01); *B29C 47/0805* (2013.01); *B29C 47/0861* (2013.01); *B29C 47/42* (2013.01); *B01F 2015/061* (2013.01); *B01F 2215/005* (2013.01); *B01F 2215/0014* (2013.01); *B01F 2215/0036* (2013.01); *B29B 7/526* (2013.01); *B29C 47/767* (2013.01); *B29C 47/822* (2013.01); *B29C 47/825* (2013.01); *B29C 47/92* (2013.01); *B29C 2947/9259* (2013.01); *B29C 2947/92095* (2013.01); *B29C 2947/92123* (2013.01); *B29C 2947/92361* (2013.01); *B29C 2947/92857* (2013.01); *B29K 2105/0032* (2013.01)

(58) Field of Classification Search
CPC ........ B01F 2215/0036; B01F 2215/005; B01F 7/00525; B01F 7/485; B01F 7/526; B29C 2947/92095; B29C 2947/92123; B29C 2947/92361; B29C 2947/92
See application file for complete search history.

(56) References Cited

U.S. PATENT DOCUMENTS

| | | | | |
|---|---|---|---|---|
| 4,437,046 | A * | 3/1984 | Faillace | B29C 47/0801 165/263 |
| 8,858,852 | B2 * | 10/2014 | Testi | B29B 7/005 264/211.23 |
| 2006/0287443 | A1* | 12/2006 | Konig | B01J 4/02 526/72 |
| 2006/0293457 | A1* | 12/2006 | Nadella | B29C 47/38 525/192 |
| 2007/0173622 | A1* | 7/2007 | Tynan, Jr. | B29C 47/0021 526/319 |
| 2011/0204296 | A1* | 8/2011 | Conzen | B29C 47/0004 252/502 |
| 2014/0335338 | A1* | 11/2014 | Burmeister | B29C 47/0004 428/220 |
| 2014/0366633 | A1* | 12/2014 | Schroeder | B29C 47/92 73/598 |
| 2017/0362407 | A1* | 12/2017 | Rust | B29B 17/04 |

FOREIGN PATENT DOCUMENTS

| | | |
|---|---|---|
| DE | 199 39 077 | 2/2001 |
| DE | 103 56 627 | 6/2005 |
| EP | 2 251 406 | 11/2010 |
| JP | H11 198214 | 7/1999 |

OTHER PUBLICATIONS

HuÃ mann J., "Dynamischer Schmelzemischer fÃ 1/4 r die Extrusionstechnik", Kunststoffe, vol. 73, Nr: 7, Jul. 1, 1983, pp. 347-348.
English translation of PCT/EP2012/005318 International Preliminary Report on Patentability.
English translation of HuÃ mann J., "Dynamischer Schmelzemischer fÃ 1/4 r die Extrusionstechnik", Kunststoffe, vol. 73, Nr: 7, Jul. 1, 1983, pp. 347-348.

* cited by examiner

PLANETARY ROLLER EXTRUDER WITH PLANET SPINDLES AND CONTACT RING

CONTINUING APPLICATION DATA

This application is a Continuation-In-Part application of International Patent Application No. PCT/2012/005318, filed on Dec. 21, 2012, which claims priority from Federal Republic of Germany Patent Application No. 10 2012 008 170.7 filed on Apr. 26, 2012. International Patent Application No. PCT/2012/005318 was pending as of the filing date of this application. The United States was an elected state in International Patent Application No. PCT/2012/005318.

BACKGROUND

1. Technical Field

The present application relates to a planetary roller extruder with planetary spindles and stop ring.

2. Background Information

Background information is for informational purposes only and does not necessarily admit that subsequently mentioned information and publications are prior art.

The present application refers to a planetary roller extruder. Planetary roller extruders are special extruders. Extruders may possibly serve to process plastics. Planetary roller extruders are suitable as well for the processing of food and other materials which can be transformed into a molten form or which will be supplied already molten into the extruder. Often the processing comprises the mixing with solid matters.

Thereby plastic, mostly in form of pellets, will be supplied into the extruder together with additives. In the extruder the input blend will be plastified, dispersed and homogenized, then cooled down to extrusion temperature and discharged in molten condition. The discharge die is named extruder tool.

It may also occur that it will be extruded without die. The die is also referred to as extrusion tool. The die is replicated to the cross section of the requested extrusion strand, i.e. the die is shaping the melt. In the ambient air and/or by means of other cooling agents the extrusion strand will be cooled down so far that the melt solidifies and the extrusion strand has got a substantially constant form. Until achievement of a sufficient solidness at the outer surfaces the extrusion strand will be hold up at the outer surfaces possibly by means of so-called calibrators.

There are diverse applications at which the extrusion tool is dispensable. This will be the case if it is extruded e.g. in several stages. In case one stage is intended it is referred to as a primary extruder which transfers the melt produced and in addition possibly further processed to the secondary extruder. Very often a degassing of the melt is intended between the two stages. For this the transfer range is then encased. In the transfer housing there will be created an underpressure compared to the melt pressure in the primary extruder so that the enclosed gas outgases out of the melt. The accrued gas will be drawn-off out of the transfer housing by means of a suitable suction device.

To the extrusion processes at which an extrusion tool is dispensable belongs as well the creation of color raw materials when the melt will be given on a plate conveyor for cooling down in order to be brought after solidification to the requested particle size by means of a crusher/grinder.

Often there are found extruders without extrusion tools if e.g. they have the task to create and—if requested—to compound it in order to impress the melt afterwards into another extruder where the melt will be blended with other materials.

Compared with other types of extruders, the planetary roller extruder may offer advantages at plastification, homogenization and cooling.

Therefore the planetary roller extruder gains more and more in importance.

Thereby combined types of construction are found often. Planetary roller extruder sections are combined with section of single-screw extruders. The sections of single-screw extruders are used in the material feeding section or at the extruder discharge. Or the planetary roller extruder sections are combined with section of other designs.

In case the planetary roller extruder sections are scheduled modularly and fabricated modularly respectively they are referred to as planetary roller extruder modules, also planetary roller modules. The modules simplify the planning and fabrication.

In most cases such combined extruder lines are referred to as planetary roller extruders because the planetary roller extruder section is considered as formative for the line.

The planetary roller extruder gains its special effectiveness by its construction and the effectiveness of its components. Core of the planetary roller extruder is a central spindle which is cogging with a multitude of planetary spindles (planetary roller spindles), in most cases 6 to 12 planetary spindles. The number of planetary spindles is normally linked to the diameter of the extruder. At larger extruder diameters there are essentially more than 12 planetary spindles.

The planetary spindles are cogging substantially simultaneously together with the internal toothing of a surrounding housing liner and with an internal toothing of the housing respectively. During revolution of the central spindle the planetary spindles are rotating around the central spindle.

The input blend will be processed in an extreme manner between the central spindle, the planetary spindles and the liner. The processing is intensely because the extrusion material will be repeatedly and thin rolled out between the planetary roller extruder parts according to the number of the planetary spindles and their meshings with the central spindle and the toothing of the housing. Consequently extreme comprehensive contacts with the melt accrue.

At the same time the processing of the extrusion material in the planetary roller extruder may be gentle because the molecular chains will be not sheared or sheared to a minimum.

The central spindle is held in axial direction by bearings which absorb the axial forces. The planetary spindles are running against a stop ring which is arranged in flow direction of the melt at the end of the planetary spindles. With their front surfaces they are gliding along the front surface of the stop ring.

The planetary roller extruders are more complex than other extruders as for example single-screw extruders and twin-screw extruders. Therefore it is be difficult for the planetary roller extruders to prevail over the single-screw extruders and twin-screw extruder in spite of significant process advantages.

OBJECT OR OBJECTS

The present application is based on the task to make the planetary roller extruder still more attractive for the application regarding special processes. As per the present application this will be reached by the fact that the speed of the central spindle will be essentially increased opposite to common speeds. As per the present application it is intended to optionally increase the speed at least twice or at least three times or at least four times or at least five times or at least six times opposite the common speed. Due to the increase of the speed as per the present application the dispersion of the blend components in the melt will be extremely increased. This may possibly be utilized for the processing of food, for the chemical industry (e.g. for the distribution of the reacting agents or for the distribution of auxiliary materials for the required and/or desired reaction), for the production of colors and for the coloring of melts, for the plastic industry (e.g. for the distribution of cross-linking agents in the plastic) and for the production of adhesives.

SUMMARY

The normal speeds of planetary roller extruders are depending on the construction size. The larger the construction size, the lower the normal speeds. Here the construction size is specified by the diametrical pitch of the internal toothing of the housing and the diametrical pitch of the internal toothing of the housing liner respectively. It can be differentiated between standard planetary roller extruder, special planetary roller extruder and planetary roller extruder in heavy execution. Actual planetary roller extruders have an involute toothing at the toothed and jointly cogging parts. The toothing is defined in DIN 867. The most important factor of the involute toothing is the tooth module. The tooth module, the number of teeth and the diametrical pitch of the toothing determine the shape of the tooth. Toothed wheels of the same module shall cog together. The diametrical pitch of the internal toothing of the housing and the internal toothing of the housing liner respectively determine the construction size.

So far there are the following construction sizes in millimeter (mm) for standard planetary roller extruders:

| Size | tooth module | max. speed of central spindle |
| --- | --- | --- |
| 70 mm | 2.5 | 220 rpm (rotation per minute) |
| 100 mm | 3 | 220 rpm |
| 120 mm | 3 | 220 |
| 150 mm | 3 | 115 |
| 180 mm | 3.5 | 80 |
| 200 mm | 3 to 3.5 | 80 |
| 250 mm | 3 | 80 |
| 300 mm. | 3.5 | 80 |
| 400 mm | 3.5 | 80 |

So far there are the following construction sizes in heavy execution of the planetary roller extruders:

| Size | tooth module | max. speed of central spindle |
| --- | --- | --- |
| 280 mm | 5.5 | 80 |
| 300 mm | 5.5 | 80 |
| 400 mm | 5.5 | 80 |
| 500 mm | 5.5 | 50 |

Not all or substantially all or most or some producers of planetary roller extruders offer like the applicant all or essentially all or substantially all above mentioned construction sizes.

On the one hand the EP2251406A1 points out to different construction sizes at planetary roller extruders and on the other hand to speeds which are between 100 and 300 rpm. However, usually or generally the smaller the speed the larger is the planetary roller extruder. That means the 300 rpm corresponds to the smallest construction size, and the 100 rpm corresponds to the largest construction size. A comparison with the above survey of common speeds in dependency on the construction size shows that the EP2251406A1 corresponds to the depicted state of technology until now.

Also the publication "High-quality extrusion with planetary rollers" in Plastics Engineering, volume 44, No. 1 of January 1988, pages 30 to 32 does not exceed this state of technology. There are mentioned 25 rpm as speed.

Also the CN202162989U does not exceed the described state of technology. There are no speeds mentioned.

Also the JPH11198214 does not exceed the described state of technology. For a construction size of 80 mm there are mentioned speeds of 100 and 140 rpm. Also the DE10356627A1 does, with regard to the speeds, not exceed the described state of technology. There are no speeds mentioned. The publication rather deals with a special drive which induces at very low speeds a high torque.

Also the US application 2007/0173622A1 does not exceed the described state of technology. A construction size of 70 millimeters is mentioned there. Speeds are not evident.

Also the DE19939077A1 does not exceed the described state of technology. An extruder of a construction size of 70 millimeters and speeds up to 110 rpm are mentioned there, whereas the speed can be reached by continuous adjustment.

Finally also in the publication "Dynamischer Schmelzemischer far die Extrusionstechnik (dynamic melt mixer for the extrusion technique)" in Kunstsroffe 73 (1983) No: 7, page 347, 348 a further state of technology cannot be found there. A speed of 85 rpm for the construction size 60 is mentioned there.

The increase of speed as per the present application refers to the maximum speed mentioned in the above list. Based on the multiplication as per the present application new speeds for the central spindle are resulting from this. The speed of the planetary spindles rotating around the central spindle in the housing is in dependency on the transmission ratio of the central spindle to the planetary spindles still higher by a multiple. Usually or generally the load of rotating parts with speeds which become higher will increase exponentially. At the same time it should be considered that the planetary spindles have a "moderate" bearing between the central spindle and the internal toothing of the housing. This bearing has a clearance which is by a multiple larger than the clearance of an ordinary shaft bearing. In addition the planetary spindles will be loaded variably over their length. This results from the different condition of the extrusion material and from the different distribution of the extrusion material in the planetary roller extruder. The different condition results from the fact that, in conveying direction of the extruder, at the beginning normally solid matters will be supplied together into the extruder and which will be distributed in the melt during the further transport through the extruder. The blend with the solid matters has another toughness/viscosity than the melt blend at the end of the extruder. The different filling results from the fact that planetary roller extruders are never fully filled with extrusion material. In at least one possible embodiment of the present application, the filling level amounts to maximum 90 percent, still further in one possible embodiment to maximum 80 percent and in yet another possible embodiment to maximum 70 percent. At the same time the conveying effect of the planetary roller extruder has to or may be taken into consideration. This results in conveying the extrusion material in direction of the outlet opening of the extruder. Basically the void volume then lies at the side of the inlet. This leads to different forces which attack at or are exerted upon the planetary spindles at different places. There is a possible expected risk that the planetary roller parts can no longer withstand the increasing load resulting from an increased speed and that the planetary spindles even could jump out of the toothing and could be destroyed or damage the toothing of the other planetary roller parts. These are concerns which oppose an increase of speed as per the present application. Surprisingly neither the rate of damage nor the extent of damage is rising due to an increase of the speed.

The multiplication/increase of the speed results in the following values:

Standard:
construction

| size | min. speed of the central spindle in rpm |
|---|---|
| 70 mm | 440 or 660 or 880 or 1100 or 1320 or 1560 |
| 100 mm | 440 or 660 or 880 or 1100 or 1320 or 1560 |
| 120 mm | 230 or 345 or 460 or 575 or 690 or 805 |
| 150 mm | 160 or 240 or 320 or 400 or 480 or 560 |
| 180 mm | 160 or 240 or 320 or 400 or 480 or 560 |
| 200 mm | 160 or 240 or 320 or 400 or 480 or 560 |
| 250 mm | 160 or 240 or 320 or 400 or 480 or 560 |
| 300 mm | 160 or 240 or 320 or 400 or 480 or 560 |
| 400 mm | 160 or 240 or 320 or 400 or 480 or 560 |

Heavy Execution:

| 280 mm | 160 or 240 or 320 or 400 or 480 or 560 |
|---|---|
| 300 mm | 160 or 240 or 320 or 400 or 480 or 560 |
| 400 mm | 160 or 240 or 320 or 400 or 480 or 560 |
| 500 mm | 160 or 240 or 320 or 400 or 480 or 560 |

As far as special planetary roller extruders with other construction sizes are existing or will be produced, these extruders will be based on the above mentioned known construction sizes for planetary roller extruders. The deviating construction sizes are then lying between known, above mentioned construction sizes. The basis of the speed as per the present application for a deviating construction size then forms the maximum speed of that above mentioned construction size which comes as close as possible to the other construction size. At the example of another construction size of 170 millimeters this means: the nearest above mentioned construction size is the construction size of 180 millimeters with a previous maximum speed of 80 rpm. Then these 80 rpm are the basis for the multiplication/increase as per the present application of the speed. In case the deviating construction size lies exactly or approximately between two known above mentioned construction sizes then the maximum speed of the nearest smaller above mentioned construction size shall be the basis for the maximum speed of the deviating construction size. At the example of a construction size of 350 millimeters this means: the next smaller mentioned construction size is the construction size of 300 millimeters with a previous speed of 80 rpm. Then these 80 rpm are the basis for the multiplication of the speed as per the present application.

The multiplication/increase of the speed as per the present application is chosen in that way that other influencing values (e.g. tooth module) than the construction size can be disregarded.

The up to now normal speeds of planetary roller extruders are partially far below the above mentioned maximum speeds, mostly between 30 and 60 rpm.

Thereby the drives are normally designed to the required and/or desired speeds, so that an increase of the speeds with the existing drives is considerably limited.

The speed of known screws in single-screw extruders and twin-screw extruders can be considerably higher than those of the planetary roller extruders. Nevertheless, these speeds cannot be used as guideline for the planetary roller extruders. Usually or generally neither the single-screw extruders nor the twin-screw extruders can be compared with the planetary roller extruders. For example, in a twin-screw extruder, there is one material kneading stock, which is important for the mixing of the material, between the two screws. A planetary roller extruder with for example 12 planetary spindles has 24 material kneading stocks between the planetary spindles and the central spindle and between the planetary spindles and the surrounding housing. Roughly considered, a planetary roller extruder with 12 planetary spindles can perform as much as 24 twin-screw extruders. Moreover the expert knows that the planetary spindles rotating around the central spindle in the surrounding housing are guided by means of their toothing in the toothing of the central spindle and in the toothing of the housing. Contrary to this, single-screw extruders are safely held in their surrounding housing and the appropriate bearings. Same is valid for screws of twin-screw extruders. The expert may fear that the sole holding of the rotating planetary spindles by means of their teeth in the toothing of the central spindle and in the toothing of the housing respectively will not be suitable with regard to high speeds. Surprisingly the danger of disruptions in operation when exceeding the previous common maximum speeds is not much higher than at customary operation of the planetary roller extruders with low speed when a minimum filling of the planetary roller extruder is essentially ensured. After exceeding the common maximal speed the minimum filling shall be in one possible embodiment 12 percent, in another possible embodiment 18 percent and in a further embodiment 24 percent. The indication of the percentage refers to the void volume in the extruder. Thereby the volume of the interior space of the housing is concerned which is not filled in by built-in parts (central spindle, planetary spindle, stop rings and other rings). The filling is the ratio of the extrusion material (e.g. plastics with filler material and other additives) existing in the housing.

At common filling during the extrusion operation the requested minimum filling as per the present application is normally given. Another situation is given at depletion of the line. The depletion appears at starting or stopping of the line. Furthermore, a depletion appears at a change of material (e.g.: the color of the extrusion material shall be changed) or when cleaning the extruder (e.g.: at operation end molten plastic will be discharged out of the extruder as otherwise it will become solid which will cause extraordinary difficulties when restarting the operation. Moreover, during cleaning, cleaning agents/cleaning granulate will be used in order to clean the surfaces coming into contact with the extrusion material). As per the present application shall a minimum filling of the void volume as per the present application in the planetary roller extruder be reached at the start before exceeding the above mentioned common speeds or rather a minimum filling of the extruder as per the present application be kept at the stopping until the undercut of the above mentioned common speeds or rather a reduction of the speed to the above mentioned common speeds be effected before emptying the extruder for a material change and during reducing the speed the minimum filling level shall be preserved.

The blend to be processed in the extruder will often only be supplied or may possible be supplied into the extruder via the above defined material feed. Furthermore, it may be possible to supply blend portions in liquid and molten form respectively later into the extruder. This happens in one possible embodiment of the present application via injection rings which are arranged between the extruder sections. Thereby the common construction type of extruder sections will be used at which the housings of the extruder sections are equipped with flanges. At the flanges the housings of the extruder sections are tensed up against each other. Thereby the injection rings can be positioned between the flanges. At the same time the essentially exact centering of the injection rings can be effected by the fact that the injection rings are embedded totally or partly into a housing end. In at least one possible embodiment of the present application, the injection rings are embedded partly in both opposite housing ends. Thereby the injection ring can optionally be used substantially simultaneously as cantering ring.

Moreover it is possible when the injection rings form substantially simultaneously the stop ring for the planetary spindles of the planetary roller section/module and/or have substantially simultaneously a connection for a temperature measuring device, in one possible embodiment a temperature sensor and/or for a pressure measuring device/pressure measuring sensor.

As far as after the dispersion and homogenization of the melt in the planetary roller extruder a degassing will become necessary and/or desired. It may be possible that the planetary spindles will receive a lower mixing effect in the range of the requested degassing in order to allow the gas a more and better opportunity to exit out of the melt. In the planetary roller extruder this can be produced by the reduction of the number of spindles and/or by a special design of the planetary spindles. A possible special design is the reduction of the number of teeth at the planetary spindles.

Also a single-screw extruder section/module for the degassing can be optionally downstream to the planetary roller extruder module in an extruder line. Then the central spindle of the planetary roller extruder module can proceed as single-screw in the in-line single-screw extruder module.

Optionally the extrusion material will be fed also into a drivable single-screw extruder being speed-independent of the planetary roller extruder. Then this in-line single-screw extruder can operate at lower speed so that the extrusion material can degas optimally before the discharge of out the line.

As far as still at another position of the extrusion line, e.g. at the feeding part and/or at another extruder section/module and/or between different extruder sections/modules, a degassing is scheduled, all or substantially all or most or some degassing locations can mutually be connected to one gas removal system. In at least one possible embodiment of the present application, a pump is located in the gas removal system by which a negative pressure can be produced in the degassing line. Thereby it is possible to heat all or substantially all or most or some degassing lines so that melt particles, which are entrained by the escaping gas, do not clog the degassing line.

As far as at another place of the extrusion line, e.g. at the feeding part and/or at another extruder section/module and/or between different extruder sections/modules a degassing is scheduled then therefore rings can be used which possess like the injections rings several functions. This includes the function as stop ring and/or the connection for pressure measuring devices and/or for temperature measuring devices and/or for the centering of the housing.

In at least one possible embodiment of the present application, torque motors may be used for the increase of the speeds. The torque motor is a multi-pole, electric direct drive. Torque motors have a high torque, i.e. the need or desire for a gear is removed. The speed may be controlled electrically. The high torque is favorable for the planetary roller extruders, in one possible embodiment for the planetary roller extruders of larger construction sizes and heavy design. On the other hand, these motors are of larger volume than common motors. Often the larger volume may be partly compensated by the omission of the otherwise normal gears.

Moreover, opposite to common motors a small degree of efficiency is granted to the torque motors. Thereby different opinions are existing whether the loss of the efficiency degree by omission of the gear and the related gains of energy, which will be otherwise consumed by the gear, will be compensated or not. In any case predominate by far the opinions which in total come to a loss of efficiency degree. This discussion concerning the efficiency degree is no recommendation for the application of torque motors.

Up to now torque motors are applied in case a high accuracy in operation is required and/or desired. Then the energy consumption is of inferior importance.

For a planetary roller extruder the path accuracy is of no relevance during operation.

However, the path accuracy can be helpful at the assembly or disassembly or rather the change of planetary spindles. Due to the substantially exact or approximate track system the planetary spindles can after the removal of the stop ring without the normal manual support partly be moved out of the housing without the risk—like at other drives—that the planetary spindles rush out and personnel and equipment will come to harm. As soon as the planetary spindles protrude far enough from the housing the planetary spindles can be grasped by hand and can be turned out between housing and central spindle. The assembly will be executed in reverse direction and corresponding advantages will be given. Anyhow, torque motors have up to now not yet be used for planetary roller extruders which are anyway very complex. This may be because it had not been realized how by means of the torque motors the assembly and disassembly of the planetary spindles can be facilitated.

At the latest at the costs for the torque motors the expert will shrink back.

Normally the costs for torque motors are by 1.5 to 2.5 times higher than the costs of common drives.

Nevertheless, the present application has chosen torque motors for the increase of the speeds.

Torque motors are found in different construction types, as permanent excited (brushless) DC-motors as switched reluctance motors as asynchronous motors as external rotor motor (stator inside, rotor outside) with the possibility of a, in at least one possible embodiment, high torque as internal rotor motor (stator outside, rotor inside) in one possible embodiment the construction type "external rotor motor" will be used for the increase of speed as per the present application, a water-cooling for the motors as well. It will be favorable if the planetary roller extruder as well has a water-cooling which then can be combined with the motor cooling.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

In the drawings there is shown an execution example of the present application.

DESCRIPTION OF EMBODIMENT OR EMBODIMENTS

Figure 1:
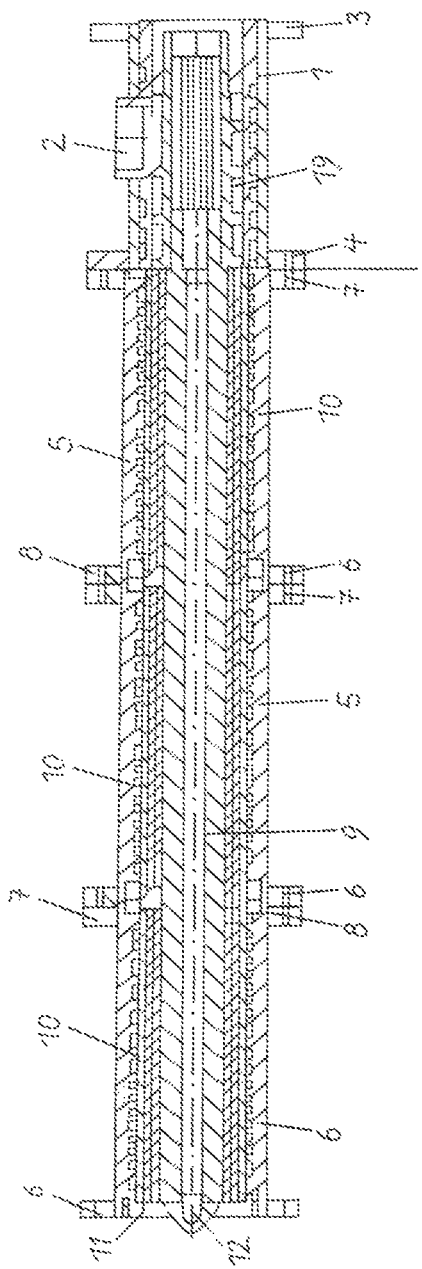
FIG. 1 shows a configuration of planetary roller extruders as disclosed in DE 19721808.

FIG. 1 shows an extruder with an overlong planetary roller part 11 and a feeding screw 1. The planetary roller part is composed of three planetary roller extruder modules with a conjoint central spindle 9. Each module comprises an outer housing 5 in pipe shape which shows flanges 6 and 7 at both ends. At the flanges 6 and 7 the modules are screwed together. Thereby the housings 5 will be centered by means of cantering rings. The cantering rings are inserted into corresponding recesses of the housing flanges.

To each planetary roller extruder module belongs also a liner. The liner is located inside in housing 5. During assembly the liners will be inserted into the housings. In at least one possible embodiment of the present application, this is done before the screwing of the flanges 6 and 7. For this the cantering rings are furnished with a boring which is equal to the boring of the housing.

Between the liners there is one stop ring 8 each located. The stop ring holds the planetary spindles 10 in their orbit position around the mutual central spindle 9. Thereby the planetary spindles are sliding at the stop ring.

The tip of the central spindle is marked with 12 and corresponds with a front stop ring 11 which has the same function like the stop rings 8 and moreover forms a gap through which the extruded material will be pressed out in direction extruder discharge.

For cantering of the stop ring 11 special cantering rings are intended which are fix connected with the housing 5. On the one hand the cantering rings fill in the recess in flange 6 which is destined for the cantering rings. On the other hand the cantering rings form at the front side an additional cantering flange.

At the right end the central spindle 9 forms a screw for an inlet zone. In this area a separate housing 1 with an inlet opening 2 is intended. The housing 1 is designed like the housing 5. The corresponding flanges are marked with 3 and 4. The coaction of the flange 4 with the connection flange 7 of the next housing 5 is the same like the coaction of the flanges 6 and 7. The feed screw at the right part of the central spindle has a filling function and a plastification function, but no essential dispersion function and homogenization function. The dispersion and homogenization are effected in the downstream planetary roller extruder modules.

Every housing 5 of a planetary roller extruder module is equipped with two cooling sections/heating sections. To the sections belong spiraled channels at the inside area of the housing, which can be supplied with a cooling/heating medium via connections.

In the execution example every planetary roller extruder module has a length of 400 millimeters resulting in a total length of 1200 millimeters.

Both planetary roller extruder modules are in not depicted manner stabilized so that a bending, which is essential for the operation, is not given.

Each planetary roller extruder module has 9 planetary spindles.

Figure 3:
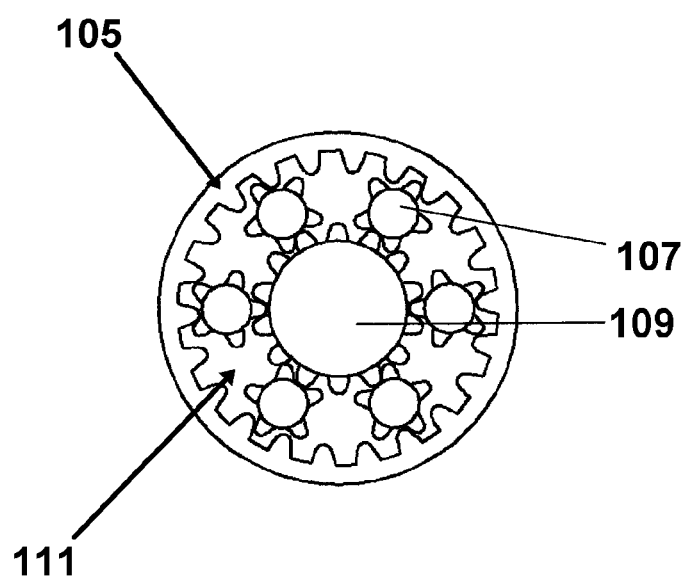
FIG. 3 shows a configuration of a planetary roller extruder such as disclosed in CN 202162989U.

FIG. 3 shows a configuration of a planetary roller extruder such as disclosed in CN 202162989U. A central spindle 109, six planetary spindles 107, and a housing liner 105 are shown, each with a toothing or teeth designed to mesh with one another. The central spindle 109 is rotated to thereby rotate the planetary spindles 107. The planetary spindles 107 rotate individually around their rotational axes, while also being moved in a rotational movement about the central spindle 109. An empty space or extrusion space 111 is defined as the space within the housing not occupied by the central spindle 109 or the planetary spindles 107. Material to be extruded is located in the extrusion space 111, where it is kneaded and mixed between the teeth of the housing liner 105, the planetary spindles 107, and the central spindle 109.

Figure 2:
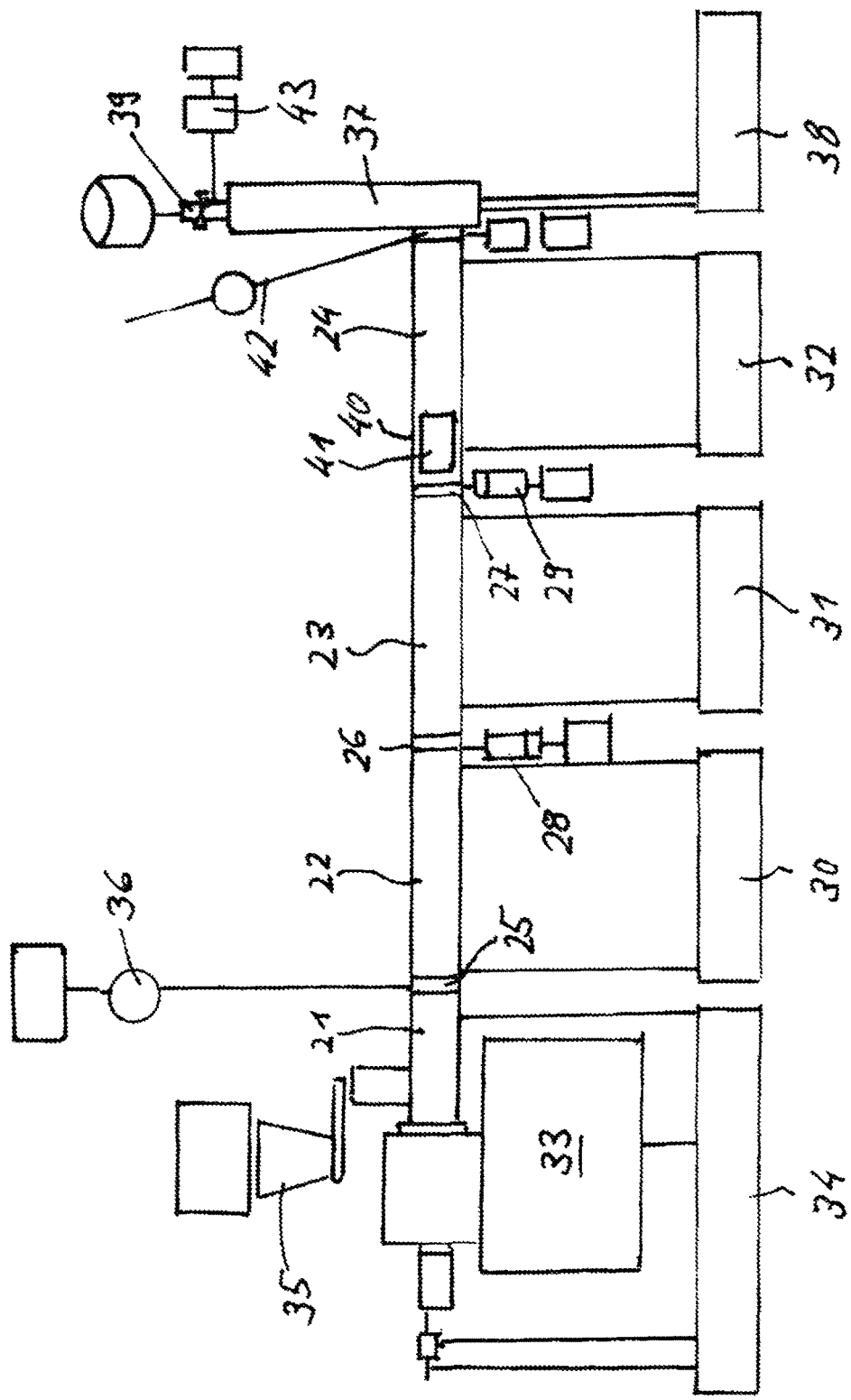
FIG. 2 shows the configuration for a speed increase as per the present application.

As per FIG. 2, an extruder line as per the present application has in the execution example also three planetary roller extruder sections/modules 22, 23, 24. All or substantially all or most or some sections/modules are penetrated by a mutual central spindle as per FIG. 1, have housings with liners, cooling and internal toothing as per FIG. 1 and planetary spindles which, as per FIG. 1, rotate inside in the housing and outside at the central spindle. The housings of the sections/modules are, as per FIG. 1, equipped with flanges at which the housing will be tensed up against each other.

As per FIG. 2, all or substantially all or most or some sections/modules have a length of 400 millimeters each so that the total length of the three sections/modules results in 1200 millimeters.

Sections/modules of a construction size of 70 millimeters (pitch diameter of the toothing of the housing) are concerned. In every section the number of planetary spindles amounts to six. Thereby the half of the planetary spindles has a length which is by 20 millimeters shorter than the other half of the planetary spindles. In the execution example the planetary spindles of the section/module 22 have a standard design, i.e. a toothing which is extended to the total spindle length.

The planetary spindles in the sections/modules 23 and 24 have a special execution which occurs when the planetary spindles will be furnished after achievement of a standard design with an additional toothing which proceeds crosswise to the toothing of the standard design. At the additional toothing tooth-forming grooves will be worked into the teeth originated after the standard toothing, normally lathed or milled. The grooves of the additional toothing cause openings in the tooth-forming lands, which remain after the standard toothing. Thus heightenings occur at the planetary spindles.

In other designs the sections/modules can show totally or partially other lengths. The same is valid for the construction size and the planetary spindles.

Also spindles may be used at which, compared with other spindles, one tooth or several teeth are missing. These spindles are called in the following IT-spindles.

At other execution examples planetary spindles have substantially simultaneously standard toothing and toothing with openings in the tooth-forming lands or standard toothing and TT-toothing or toothing with opening in the tooth-forming lands and TT-toothing. In straight direction of the extrusion material, a feeding part 21 is upstream to the planetary roller extruder sections/modules. The feeding part is of the construction type of a single-screw extruder. The screw, intended in its housing is in one possible embodiment one-piece with the central spindle for the planetary roller extruder sections/modules. At other execution examples segmented central spindles are intended. In at least one possible embodiment of the present application, a design of segmented central spindles provides a centrically through the central spindle exceeding draw bar on which there is a multitude of outside toothed bushes. Theses bushes are tensed up with each other with the draw bar. In at least one possible embodiment of the present application, these bushes are toothed with each other at the places of joint. This simplifies the tensioning of the bushes and secures that in case of a too low tensioning no twist of the bushes against each other will occur. This design allows the replacement of one or several bushes which are exposed to a special wear or which have been damaged by unforeseen circumstances. The other bushes will remain. This reduces the costs. This may be valid for the case of complicated toothing places.

The toothing will become complicated at a change of the toothing, e.g. at a change from the standard toothing to the toothing with openings in the tooth-forming lands or to TT-toothing.

Moreover, this type of construction offers a possible storage of outside toothed central spindle bushes which can be slipped on a draw bar and which can be tensed up with each other. The bushes can optionally be adapted to the corresponding extruder sections/modules. That is to say, the bushes can show the same length, a larger length or a shorter length than the corresponding modules. Thereby the bushes can complement each other to a measurement which is equal to the length of a module.

The above described bush technique can also include the feeding part of the extruder. The feeding part serves for the supply of the extrusion material into the extruder. Mostly the feeding part is formed in the construction type of a single-screw extruder. When applying the bush technique to a single-screw extruder module as feeding part then one or several bushes, which are tensed up on the draw bar with other bushes of other modules, belong to the feeding part. These bushes are designed outside as a screw. In case for a feeding part, several bushes are intended which form mutually the screw then each bush forms outside a part of the screw and all or substantially all or most or some bushes intended for the feeding part form mutually the screw of the feeding part. To the above mentioned by means of the bushes for a central spindle explained embodiments can be added that also changes in the toothing as e.g. alteration with regard to the teeth depth or changes in distances between the teeth or rather the lands which are forming the teeth will be simplified. Such alterations are for example purposeful with regard to the volume increase in order to create the framework requirements for a degassing. Volume decreasing alterations, however, are purposeful for a pressure increase in the feeding part.

In other execution examples, a single-screw extruder module is intended at the discharge end of the extruder. This module serves for the increase of the discharge pressure in case the melt pressure achieved until then is insufficient for a sufficient forming in an extrusion tool.

In the execution example the feeding part 21 has a hopper above which a gravimetric dosing unit is arranged.

The central spindle/screw is driven by a torque motor 33.

In the execution example powdery filling material is supplied into the feeding part 21. Between the feeding part 21 and the planetary roller extruder section 22 an injection ring 25 is intended. Via this ring molten plastic will be injected. The necessary and/or desired pressure will be produced by means of a pump 36. The molten plastic can be taken out of a storage tank/buffer or can be produced from plastic granulate by means of a side-arm extruder. Thereby, the granulate can be a compound and comprise several components. Besides the plastic the intended materials can also be supplied together with the plastic granulate into the side-arm extruder in order to be processed there to a molten blend.

Between the planetary roller extruder sections/modules 22 and 23 on the one hand and 23 and 24 on the other hand there are intended as well rings 26, 27. In the execution example these rings 26, 27 serve for the pressure measurement and temperature measurement. The corresponding devices are marked 28 and 29.

In the planetary roller extruder sections/modules the proportions of the blend will be dispersed and homogenized into each other. Thereby, the central spindle is rotating with 500 or 800 rpm during operation. This causes an extremely fine distribution of the proportions of the blend into each other.

From the planetary roller extruder section/module 24, the melt is transferred to a degassing extruder 37 which is designed as single screw extruder and which is driven speed independent by the planetary roller extruder sections/modules. Thereby the speed of the corresponding single-screw will be reduced so far that the enclosed gas may escape and can be drawn-off by means of a suction pump and suction pipe 42.

After the degassing the pressure will be increased again sufficiently in order to discharge the melt through a die 39 out of the extruder 37. At the discharge there are temperature and pressure measurement devices 43 intended.

Moreover, a further degassing possibility at the planetary roller extruder section/module 24 is shown in dashed lines and marked with 40.

Furthermore the planetary roller extruder section/module 24 shows an optionally usable connection 41 for an additional lateral material supply.

The extruder line is equipped with a cooling device comprising the elements 30, 31, 32, 34, 38 and which allows independent temperature controls in the planetary roller extruder sections/modules and in the feeding part, the motor as well as the single-screw which is located at the discharge side.

One feature or aspect of an embodiment is believed at the time of the filing of this patent application to possibly reside broadly in an operation of an extruder line by means of a planetary roller extruder or planetary roller extruder section or planetary roller extruder module with a central spindle, planetary spindles and an internal toothed housing liner or rather an internal toothed housing, whereat the planetary spindles are gliding with the front surfaces in melt flow direction at a stop ring and thereby rotate around the central spindle and in the surrounding housing whereat their toothing is cogging substantially simultaneously with the toothing of the central spindle and the internal toothing of the housing, thereby marked that the central spindle in dependency of the construction size in millimeters will be moved at least with the following speed in rpm:

| | |
|---|---|
| 70 mm | 440 rpm |
| 100 mm | 440 |
| 120 mm | 440 |
| 150 mm | 230 |
| 180 mm | 160 |
| 200 mm | 160 |
| 250 mm | 160 |
| 280 mm | 160 |
| 300 mm | 160 |
| 400 mm | 160 |
| 500 mm | 160 |

Another feature or aspect of an embodiment is believed at the time of the filing of this patent application to possibly reside broadly in the operation of an extrusion line, thereby marked that the central spindle in dependency of the construction size in millimeters will be moved at least with the following speed in rpm:

| | |
|---|---|
| 70 mm | 660 rpm |
| 100 mm | 660 |
| 120 mm | 660 |
| 150 mm | 345 |
| 180 mm | 240 |
| 200 mm | 240 |
| 250 mm | 240 |
| 280 mm | 240 |
| 300 mm | 240 |
| 400 mm | 240 |
| 500 mm | 240 |

Yet another feature or aspect of an embodiment is believed at the time of the filing of this patent application to possibly reside broadly in the operation of an extrusion line, thereby marked that the central spindle in dependency of the construction size in millimeters will be moved at least with the following speed in rpm:

| | |
|---|---|
| 70 mm | 880 rpm |
| 100 mm | 880 |
| 120 mm | 880 |
| 150 mm | 460 |
| 180 mm | 320 |
| 200 mm | 320 |
| 250 mm | 320 |
| 280 mm | 320 |
| 300 mm | 320 |
| 400 mm | 320 |
| 500 mm | 320 |

Still another feature or aspect of an embodiment is believed at the time of the filing of this patent application to possibly reside broadly in the operation of an extrusion line, thereby marked that the central spindle in dependency of the construction size in millimeters will be moved at least with the following speed in rpm:

| | |
|---|---|
| 70 mm | 1100 rpm |
| 100 mm | 1100 |
| 120 mm | 1100 |
| 150 mm | 575 |
| 180 mm | 400 |
| 200 mm | 400 |
| 250 mm | 400 |
| 280 mm | 400 |
| 300 mm | 400 |
| 400 mm | 400 |
| 500 mm | 400 |

A further feature or aspect of an embodiment is believed at the time of the filing of this patent application to possibly reside broadly in the operation of an extrusion line, thereby marked that the central spindle in dependency of the construction size in millimeters will be moved at least with the following speed in r.p.m.

| | |
|---|---|
| 70 mm | 1320 rpm |
| 100 mm | 1320 |
| 120 mm | 1320 |
| 150 mm | 690 |
| 180 mm | 480 |
| 200 mm | 480 |
| 250 mm | 480 |
| 280 mm | 480 |
| 300 mm | 480 |
| 400 mm | 480 |
| 500 mm | 480 |

Another feature or aspect of an embodiment is believed at the time of the filing of this patent application to possibly reside broadly in the operation of an extrusion line, thereby marked that the central spindle in dependency of the construction size in millimeters will be moved at least with the following speed in rpm:

| | |
|---|---|
| 70 mm | 1560 rpm |
| 100 mm | 1560 |
| 120 mm | 1560 |
| 150 mm | 805 |
| 180 mm | 560 |
| 200 mm | 560 |
| 250 mm | 560 |
| 280 mm | 560 |
| 300 mm | 560 |
| 400 mm | 560 |
| 500 mm | 560 |

Yet another feature or aspect of an embodiment is believed at the time of the filing of this patent application to possibly reside broadly in the operation of an extrusion line, thereby marked that at starting of the extruder and at stopping of the extruder during the flow the following minimum speed in rpm of the central spindle in dependency of the construction size in millimeters

| | |
|---|---|
| 70 mm | 220 rpm |
| 100 mm | 220 |
| 120 mm | 220 |
| 150 mm | 115 |
| 180 mm | 80 |
| 200 mm | 80 |
| 250 mm | 80 |
| 280 mm | 80 |
| 300 mm | 80 |
| 400 mm | 80 |
| 500 mm | 80 | a minimum filling of 6 percent, in one possible embodiment of 12 percent, in another possible embodiment of 18 percent and in yet another possible embodiment of 24 percent will be kept.

Still another feature or aspect of an embodiment is believed at the time of the filing of this patent application to possibly reside broadly in the operation of an extrusion line, marked by the use of a downstream degassing extruder, in one possible embodiment a degassing extruder designed as single-screw extruder, with a drive being speed independent of the planetary roller extruder.

A further feature or aspect of an embodiment is believed at the time of the filing of this patent application to possibly reside broadly in the operation of an extrusion line, marked by the use of a torque motor as drive.

Another feature or aspect of an embodiment is believed at the time of the filing of this patent application to possibly reside broadly in the operation of an extrusion line, marked by the use of a torque motor with an external rotor as drive.

Yet another feature or aspect of an embodiment is believed at the time of the filing of this patent application to possibly reside broadly in the operation of an extrusion line, marked by the use of a torque motor with water cooling.

Still another feature or aspect of an embodiment is believed at the time of the filing of this patent application to possibly reside broadly in the operation of an extrusion line, marked by the connection of the cooling of the torque motor to a mutual cooling unit with the planetary roller extruder sections and/or other parts of the extruder line.

A further feature or aspect of an embodiment is believed at the time of the filing of this patent application to possibly reside broadly in the operation of an extrusion line, marked by the use of food.

Another feature or aspect of an embodiment is believed at the time of the filing of this patent application to possibly reside broadly in the operation of an extrusion line, marked by the use to the blend of chemical reacting agents or to the blend of reaction additives.

Yet another feature or aspect of an embodiment is believed at the time of the filing of this patent application to possibly reside broadly in the operation of an extrusion line, marked by the use to the production of colors.

At an extrusion line with a planetary roller extruder or planetary roller extruder section or planetary roller extruder module the speed of the central spindle for a fine dispersion will be increased as per the present application by a multiple of the else known maximum speeds.

The components disclosed in the patents, patent applications, patent publications, and other documents disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, patent applications, patent publications, and other documents either incorporated by reference or not incorporated by reference.

All of the patents, patent applications, patent publications, and other documents, except for the exceptions indicated herein, which were cited in the International Search Report dated Apr. 26, 2013, and/or cited elsewhere, as well as the International Search Report document itself, are hereby incorporated by reference as if set forth in their entirety herein except for the exceptions indicated herein, as follows: EP 2 251 406, having the title "METHOD FOR PRODUCING AND USING KILN-DRIED MALT", issued on Nov. 17, 2010; "High-quality extrusion with planetary rollers", published in PLASTICS ENGINEERING, vol. 44, no. 1, Jan. 1, 1998, pages 30-32; CN 202162989, having the title "Conical planetary screw rod extruding machine", published on Mar. 14, 2012; DE 10356627, having the title "Plastics extrusion unit with multi-axis direct drive using electric drive unit with 2 or more rotors for respective extrusion screws and segmental stator", published on Jun. 30, 2005; DE 19939077, having the title "Verfahren zur kontinuierlichen, lösungsmittel- and mastikationsfreien Herstellung von druckempfindlichen Selbstklebemassen auf Basis von nicht-thermoplastischen Elastomeren sowie deren Beschichtung zur Herstellung von selbstklebenden Artikeln", published Feb. 22, 2001; JPH11198214, having the title "MANUFACTURE OF RUBBER MOLDED ARTICLE", published on Jul. 27, 1999; US 2007/173622, having the title "Continuous Bulk Polymerization In A Planetary Roller Extruder", published Jul. 26, 2007; "Dynamischer Schmelzemischer fÃ ¼r die Extrusionstechnik," published in Kunststoffe, Vol. 73, No. 7, Jul. 1, 1983 m pages 347-348; and DE 19721808, having the title "Planetary gear extruder for plastics processings," published on Nov. 26, 1998.

The corresponding foreign and international patent publication applications, namely, Federal Republic of Germany Patent Application No. 10 2012 008 170, filed on Apr. 26, 2012, having inventor Harald RUST, and DE-OS 10 2012 008 170 and DE-PS 10 2012 008 170, and International Application No. PCT/2012/005318, filed on Dec. 21, 2012, having WIPO Publication No. WO2013/159801 and inventor Harald RUST, are hereby incorporated by reference as if set forth in their entirety herein, except for the exceptions indicated herein, for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications, patent publications, and other documents, except for the exceptions indicated herein, are hereby incorporated by reference as if set forth in their entirety herein except for the exceptions indicated herein.

The purpose of incorporating the corresponding foreign equivalent patent application(s), that is, PCT/2012/005318 and German Patent Application 10 2012 008 170, is solely for the purposes of providing a basis of correction of any wording in the pages of the present application, which may have been mistranslated or misinterpreted by the translator, and to provide additional information relating to technical features of one or more embodiments, which information may not be completely disclosed in the wording in the pages of this application.

Statements made in the original foreign patent applications PCT/2012/005318 and DE 10 2012 008 170 from which this patent application claims priority which do not have to do with the correction of the translation in this patent application are not to be included in this patent application in the incorporation by reference.

Any statements about admissions of prior art in the original foreign patent applications PCT/2012/005318 and DE 10 2012 008 170 are not to be included in this patent application in the incorporation by reference, since the laws relating to prior art in non-U.S. Patent Offices and courts may be substantially different from the Patent Laws of the United States.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

Words relating to the opinions and judgments of the author of all patents, patent applications, patent publications, and other documents cited herein and not directly relating to the technical details of the description of the embodiments therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments of the patents, patent applications, patent publications, and other documents, are not considered to be incorporated by reference herein for any of the patents, patent applications, patent publications, and other documents cited herein.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. § 1.72(b). As stated in 37 C.F.R. § 1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A method of extruding material with a planetary roller extruder, said planetary roller extruder comprising:
a housing comprising an internal toothing;
a central spindle being disposed within said housing and comprising an external toothing;
planetary spindles being disposed about said central spindle and within said housing, and each comprising an external toothing configured to mesh with both said internal toothing of said housing and said external toothing of said central spindle;
an extrusion space being configured to contain material during extrusion thereof, said extrusion space being the empty space within said housing not occupied by said central spindle and said planetary spindles;
said method comprising the steps of:
rotating said central spindle about its rotational axis at a rotational speed, and thereby both rotating said planetary spindles about each of their rotational axes and revolving said planetary spindles about said central spindle;
increasing said rotational speed to a first speed;
increasing said rotational speed to at least a second speed, which second speed is substantially higher than said first speed;
kneading, mixing, and extruding material in said extrusion space while said central spindle is being rotated at at least said second speed; and
continuously maintaining an amount of material in said extrusion space while said central spindle is being rotated at said first speed or higher, which amount of material being sufficient to fill at least 6% of said extrusion space.

2. The method according to claim 1, wherein said second speed is at least two times as fast as said first speed.

3. The method according to claim 2, wherein said second speed is at least three times as fast as said first speed.

4. The method according to claim 3, wherein said second speed is at least four times as fast as said first speed.

5. The method according to claim 4, wherein said second speed is at least five times as fast as said first speed.

6. The method according to claim 5, wherein said second speed is at least six times as fast as said first speed.

7. The method according to claim 6, wherein said second speed is at least seven times as fast as said first speed.

8. The method according to claim 7, wherein:
said internal toothing of said housing has a pitch diameter of about 70 millimeters to about 120 millimeters; and
said first speed is 220 revolutions per minute.

9. The method according to claim 7, wherein:
said internal toothing of said housing has a pitch diameter of about 150 millimeters; and
said first speed is 115 revolutions per minute.

10. The method according to claim 7, wherein:
said internal toothing of said housing has a pitch diameter of about 180 millimeters to about 500 millimeters; and
said first speed is 80 revolutions per minute.

11. The method according to claim 7, wherein said amount of material is sufficient to fill 6% to 24% of said extrusion space.

12. The method according to claim 11, wherein:
said step of kneading and mixing comprises generating a melt of feed material;
said method further comprises degassing said melt in a downstream degassing extruder comprising a single-screw extruder and a drive configured to operate at a speed independent of said planetary roller extruder;
said central spindle is rotated by a drive comprising a torque motor;
said torque motor comprises an external rotor;
said method further comprises cooling said torque motor with water;
said method further comprises cooling said torque motor, sections of said planetary roller extruder, and/or said degassing extruder with a common cooling unit; and
said feed material comprises one of: food, a blend of chemical reacting agents or reaction additives, and colors.

13. The method according to claim 2, wherein:
said internal toothing of said housing has a pitch diameter of about 70 millimeters to about 120 millimeters; and
said first speed is 220 revolutions per minute.

14. The method according to claim 13, wherein said amount of material is sufficient to fill 6% to 24% of said extrusion space.

15. The method according to claim 2, wherein:
said internal toothing of said housing has a pitch diameter of about 150 millimeters; and
said first speed is 115 revolutions per minute.

16. The method according to claim 15, wherein said amount of material is sufficient to fill 6% to 24% of said extrusion space.

17. The method according to claim 2, wherein:
said internal toothing of said housing has a pitch diameter of about 180 millimeters to about 500 millimeters; and
said first speed is 80 revolutions per minute.

18. The method according to claim 17, wherein said amount of material is sufficient to fill 6% to 24% of said extrusion space.

19. The method according to claim 1, wherein said method further comprises:
feeding material into said extrusion space until said amount of material fills at least 6% of said extrusion space before increasing said rotational speed to said first speed;
continuing feeding material into said extrusion space while said central spindle is rotating at said first speed or higher at a feed rate sufficient to maintain said at least 6% filling of said extrusion space;
stopping and/or slowing feeding of material into said extrusion space, and thereby reducing said amount of material in said extrusion space such that less than 6% of said extrusion space is filled;
decreasing said rotational speed to a third speed lower than said first speed before said amount of material fills less than 6% of said extrusion space; and
continuing extruding material at said third speed lower than said first speed until all material has been removed from said planetary roller extruder.

20. The method according to claim 1, wherein said step of continuously maintaining an amount of material in said extrusion space sufficient to fill at least 6% of said extrusion space comprises minimizing wear and/or damage to said planetary roller extruder caused by operation of said planetary roller extruder at speeds higher than said first speed.

* * * * *